Dec. 9, 1941.    W. E. MARTIN    2,265,850

TRAILER HITCH

Filed March 18, 1940

INVENTOR.
W. E. MARTIN

BY Merrill M. Blackburn.
ATTORNEY

Patented Dec. 9, 1941

2,265,850

UNITED STATES PATENT OFFICE 2,265,850

TRAILER HITCH

William E. Martin, Kewanee, Ill.

Application March 18, 1940, Serial No. 324,654

5 Claims. (Cl. 280—33.17)

This invention has reference to trailer hitches and particularly to hitches for heavy duty work in connection with trailers for hauling heavy machinery or the like, though it should be understood that hitches in accordance with this invention are of general utility.

As is only too well known, prior trailer hitches have given considerable trouble, both by breakage and by coming apart while traveling. These defects of prior trailer hitches are particularly common in heavy duty work. Also, there is no reliable hitch which will function successfully and yet allow the two portions of the hitch to be turned with respect to each other in a vertical longitudinal plane up to about thirty degrees out of line.

Accordingly, it is an object of the present invention to provide a trailer hitch which is of simple, durable construction and which is reliable in operation. A further object of this invention is the provision of a hitch of such construction that it will be reliable in operation even though sufficient clearance is provided to allow the two portions of the hitch to be turned up to about thirty degrees out of line in a vertical longitudinal plane through the hitch.

Figure 1:
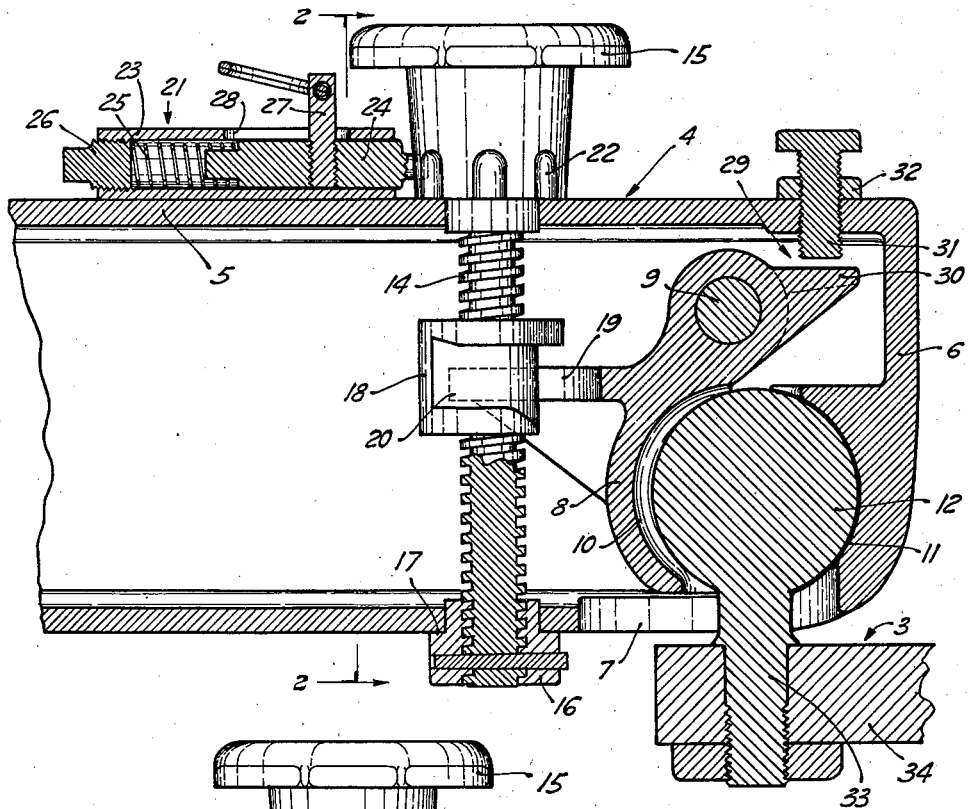
Figure 2:
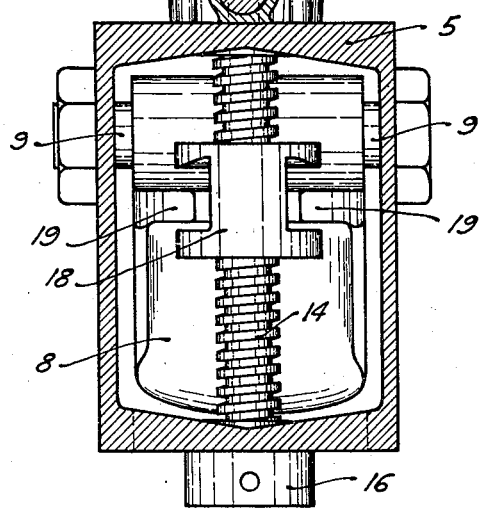

Other objects and advantages of this invention will be made clear in and be obvious from the following description, taken in conjunction with the accompanying drawing in which like numerals in the various figures refer to similar parts and in which, Fig. 1 is a longitudinal vertical section through my improved trailer hitch, and Fig. 2 is a transverse vertical section substantially on the line 2—2 in Fig. 1.

Referring now more particularly to the form of the invention shown in the accompanying drawing, my improved hitch comprises a male or ball member 3 and a female or socket member 4. The socket member 4 is built into the end portion of a hollow draw bar 5, rectangular in section, which forms a part of the hitch. The end 6 of bar 5 is closed and the lower side of the bar adjacent the end 6 is provided with an opening 7. An arm 8 is pivoted on the pin 9 in the end portion of the bar 5 and normally extends from the pin 9 in the direction of the opening 7. The facing surfaces of the closed end portion 6 and the arm 8 are provided each with a concave seat 10, 11 complemental to the ball 12 of the ball member 3. The opening 7 is of sufficient size to allow passage of the ball 12, and the arm 8 may be pivoted about the pin 9 away from the end portion 6 to allow passage of the ball 12 to a position between the seats 10 and 11, whereupon the arm 8 may be pivoted to move the seats 10 and 11 together whereby to hold the ball.

A threaded shaft 14 is mounted vertically in the bar on the opposite side of the arm 8 from the end portion 6. To one end of shaft 14 exteriorly of the bar 5, a knob 15 is secured by which the shaft may be rotated manually, and whereby the shaft is prevented from sliding through the bar in one direction. A sleeve 16 having a shoulder 17 is secured to the opposite end of the shaft 14 and prevents the shaft from sliding in the other direction. A lead nut 18 threadedly engages the shaft 14 within the bar. A pair of follower arms 19 secured to the arm 8 engages in channels 20 in the lead nut 18 on opposite sides of the nut. As the channels 20 are straight, i. e., the bight portions of the channels are parallel to the length of the bar, the arms 19 prevent the nut 18 from turning about the shaft 14. Accordingly, when the shaft 14 is turned by the knob 15, the lead nut moves along the shaft in a direction depending upon the direction in which the knob 15 is turned. The follower arms 19 accordingly move along the shaft thereby turning the arm 8 about the pin 9, either opening or closing the socket.

To prevent accidental rotation of the knob 15, latching means 21 is provided. The latching means 21 involves a series of openings 22 about the base of the knob and a spring-pressed latch having a tubular housing 23, a latch bar 24 for reciprocation therein and for engagement in the openings 22, a presser spring 25 in the housing 23 for normally moving latch bar 24 into engagement with the knob 15 in one of openings 22, a stop 26 to hold the rear end of spring 25, and an operating arm 27 secured to latch bar 24 arranged to slide in slot 28 in housing 23 when retracting the latch bar.

A stop mechanism 29 is provided for regulating the extent of closure of the seats 10 and 11 under normal operation of the knob 15. This stop mechanism comprises a finger 30 secured to the arm 8 and extending toward the end portion 6, and an adjusting bolt 31 provided with a lock nut 32, which bolt threadedly engages in the bar 5 to bear against the finger 30 in a direction to limit the extent of movement together of the seats 10 and 11.

The neck 33 which connects the ball 12 to the bar 34 is of a sufficiently small diameter with respect to the distance between the lower edges of the seats 10 and 11 when the socket is closed upon the ball 12 that the bar 5 and the bar 34 may be moved relatively in the plane of Fig. 1 to an angle of about thirty degrees.

In operation with the socket open and the adjusting nut 18 in elevated position, the socket member 4 is placed upon the ball member 3, the ball 12 entering the opening 7 and being received between the seats 10 and 11. The latch bar 24 is then disengaged from the knob 15 by drawing the operating arm 27 away from the knob. The knob 15 is turned in a direction to move the seats 10 and 11 together, and turning thereof is continued until the joint is as tight as is desired in operation. The stop means is then adjusted by turning down the stop bolt 31 into engagement with the arm 30 and is locked in adjusted position by lock nut 32. The spring 25 automatically returns the latch bar into engagement with the knob 15, though it may be necessary to turn the knob slightly to effect engagement of the latch bar in one of the openings 22. For subsequent connection and disconnection of the hitch, all that is necessary is to operate the knob 15 and the latching means 21, the adjustment of the stop means being permanent except to compensate for wear of the seats 10, 11 and the ball 12.

While I have shown and described but a single embodiment of my hitch, it should be understood that the scope of the invention is not limited thereto but is limited only by the subjoined claims.

Having now described my invention, I claim:

1. In a trailer hitch, the combination of a trailer draw-bar having at its hitch end a housing, a screw extending transversely through and rotatably mounted in opposite sides of said housing, internally screw-threaded means surrounding said screw and movable therealong for adjustment transversely of the housing, a pivoted member mounted in said housing and having an arm extending laterally away from the body of the pivoted member and toward the screw and projecting into engagement with said screw-threaded means to be adjusted thereby when the screw is turned, said pivoted means comprising a part of the socket of a ball and socket joint, and an internal face of a wall of said housing being provided with another part of said socket of said ball and socket joint.

2. In a trailer hitch, the combination of a trailer draw-bar having at its hitch end a housing, a screw extending transversely through and rotatably mounted in opposite sides of said housing, internally screw-threaded means surrounding said screw and movable therealong for adjustment transversely of the housing, a pivoted member mounted in said housing and having an arm projecting into engagement with said screw-threaded means to be adjusted thereby when the screw is turned, said pivoted means comprising a part of the socket of a ball and socket joint, and an internal face of a wall of a housing being provided with another part of said socket of said ball and socket joint, the pivoted member having a finger projecting therefrom for cooperation with an internal projection extending inwardly from a wall of the housing, and an internal projection adjustably mounted with relation to said wall and cooperating with said finger to furnish a stop for limiting movement of said pivoted member.

3. A trailer hitch socket unit, comprising a hollow body having a ball seat closing its free end, a second seat pivoted by one of its edges to the body and located therein in a position facing the ball seat, a threaded shaft rotatably carried by said body and extending therethrough, threaded means in screw-threaded engagement with said shaft movable therealong, and follower means secured to the second seat and having interengaging non-threaded connection with the threaded means, said shaft and the pivotal axis of the second seat being non-intersecting and at a substantial angle to each other whereby rotation of said shaft effects pivoting of said second seat toward and from the fixed seat.

4. A trailer hitch comprising a support, a pair of ball seats, one of which is fixedly mounted on the support and the other of which is mounted for movement toward and from the fixedly mounted seat, adjustable means for effecting adjustment of the two seats together, means for latching the adjusting means in adjusted position, and an adjustable stop means for adjustably limiting the extent of movement of the seats together under action of said adjusting means, the pivotally mounted ball seat having an arm projecting therefrom into proximity with the adjustable stop means so that movement of the pivoted ball seat toward clamping position with relation to the ball may be limited and pressure upon the ball may be regulated.

5. In a hitch for a trailer provided with a housing equipped with a socket; the combination of a member pivotally mounted in the housing, said member being provided with one part of the socket part of said hitch, and a wall of said housing being provided with another part of the socket part of said hitch, screw-threaded means for positively moving said pivotally mounted member and holding it in moved position, and adjustable means for limiting the closing movement of the pivotally mounted member in the housing, the pivotally mounted member having an abutment for cooperation with the adjustable means.

WILLIAM E. MARTIN.